(12) United States Patent
Emelyanov et al.

(10) Patent No.: US 10,733,109 B1
(45) Date of Patent: Aug. 4, 2020

(54) MEMORY RECLAIM MANAGEMENT FOR VIRTUAL MACHINES

(71) Applicant: Virtuozzo International GmbH, Schaffhausen (CH)

(72) Inventors: Pavel Emelyanov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 0 days.

(21) Appl. No.: 16/506,569

(22) Filed: Jul. 9, 2019

Related U.S. Application Data

(63) Continuation of application No. 15/393,511, filed on Jan. 21, 2017, now Pat. No. 10,346,313.

(51) Int. Cl.
*G06F 12/1009* (2016.01)
*G06F 9/455* (2018.01)
*G06F 12/14* (2006.01)

(52) U.S. Cl.
CPC ...... *G06F 12/1009* (2013.01); *G06F 9/45558* (2013.01); *G06F 12/14* (2013.01); *G06F 2009/45583* (2013.01); *G06F 2212/1052* (2013.01); *G06F 2212/152* (2013.01)

(58) Field of Classification Search
CPC .. G06F 12/1009; G06F 12/14; G06F 9/45558; G06F 2212/152; G06F 2009/45583; G06F 2212/1052
See application file for complete search history.

(56) References Cited

U.S. PATENT DOCUMENTS

| 9,547,520 B1* | 1/2017 | Bailey | G06F 9/45558 |
| 2012/0290765 A1* | 11/2012 | Durrant | G06F 9/5022 711/6 |
| 2014/0108765 A1* | 4/2014 | Li | G06F 12/123 711/171 |

* cited by examiner

*Primary Examiner* — Francisco A Grullon
(74) *Attorney, Agent, or Firm* — Bardmesser Law Group

(57) ABSTRACT

System for for managing host reclaimable memory based on VM needs includes a plurality of VMs; a hypervisor configured to process VM memory requests; a host CPU configured to control host physical memory reclaim process; at least one VM being allocated physical memory; Guest tool configured to determine page types based on a memory map; and a host module configured to scan an LRU list for pages that it can reacquire, and to force a slowdown in VM operations when reclaim operations use up more than a predefined share of CPU time. The host CPU performs the following based on the page type: (i) hard lock protection, when the page is a VM kernel page, for host-based reclaim of the page when no other VM pages are left to reacquire; and (ii) access/dirty (A/D) bit marking, when the page is a regular VM page.

20 Claims, 8 Drawing Sheets

MEMORY RECLAIM MANAGEMENT FOR VIRTUAL MACHINES

CROSS-REFERENCE TO RELATED APPLICATIONS

This application is a continuation in part of U.S. patent application Ser. No. 15/393,511, filed on Jan. 21, 2017, incorporated herein by reference in its entirety.

BACKGROUND OF THE INVENTION

Field of the Invention

The invention relates to memory management, and, more particularly, to an efficient method for informing a host about the actual memory needs of a Virtual Machine (VM) for individual pages.

Description of the Related Art

The industry trend of virtualization and a use of a number of Virtual Machines (VMs) running on the same host presents some challenges to effective memory management. Consider a host system that runs several VMs. When the amount of physical memory is sufficient to serve the needs of the VMs (i.e. RAM_node>=sum (RAM_vm)), the system works well. However, once there is an extra demand for RAM (i.e., RAM_node<sum (RAM_vm)), the so called "memory reclaim" mechanism starts operating, which makes system operation significantly slower. The memory reclaim mechanism scans the RAM and attempts to move the pages (contents) to disk and then re-use the pages by giving them to the VMs that need additional pages.

In addition to spending some extra time on scanning the RAM and performing the IO operations, the memory reclaim mechanism presents other problems to the host system. The root of these problems is in the fact that when searching for memory, the host kernel scans the host RAM in an LRU (least recently used) order—i.e., the pages that were used long time ago are reclaimed before those that were used recently.

In case of VMs, this presents a significant problem, because the host kernel scans through host LRU lists and ignores the pages from the VMs. Conventional virtualization systems do not provide any solutions for a VM to share its LRU data with the host. As a result the pages reclaimed by the host may be in active use by a VM or can be otherwise critical for the VM (e.g., VM kernel pages). Subsequent access to the reclaimed pages slows the host system down, as the page in question has to be allocated (thus causing yet another reclaim pass) and the contents of the page has to be read from the disk.

Accordingly, it is desired to have an efficient method for informing the host about the actual VM needs for the individual pages.

SUMMARY OF THE INVENTION

The invention relates to virtualization, and, more particularly, to a method and system for informing a host about actual Virtual Machine (VM) needs for individual pages that substantially obviates one or more disadvantages of the related art.

In one aspect, a method, system and computer product for managing host reclaimable memory based on Virtual Machine (VM) includes a plurality of VMs running on the host and executing user processes; a hypervisor configured to process VM memory requests; a host CPU configured to control host physical memory reclaim process; at least one VM requiring host physical memory; a VM configuration utility Guest tools configured to determine page types based on a memory map; and a host module configured to scan a Least Recently Used (LRU) list for pages. The host CPU performs a legacy reclaim operation, when the page is not a VM page; executes a hard lock protection, when the page is a VM kernel page; executes a direct access (DAX) LRU operation, when the page is a VM DAX page; and executes access/dirty (A/D) bit marking, when the page is a regular VM page.

In another aspect, a system for for managing host reclaimable memory based on Virtual Machine (VM) needs includes a plurality of VMs running on the host; a hypervisor configured to process VM memory requests; a host CPU configured to control host physical memory reclaim process; at least one VM being allocated physical memory by the host; a Guest tool configured to determine page types based on a memory map; and a host module configured to scan a Least Recently Used (LRU) list for pages that it can reacquire, and to force a slowdown in VM operations when reclaim operations use up more than a predefined share of CPU time. The host CPU performs one of the following based on the page type: (i) executes a hard lock protection, when the page is a VM kernel page, to perform a host-based reclaim of the page for the host when no other VM pages are left to reacquire; and (ii) executes access/dirty (A/D) bit marking, when the page is a regular VM page, to perform the host-based reclaim of the page for the host from the at least one VM.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The following definitions are used throughout the description.

Virtual Execution Environment, a type of environment that supports program code execution, where at least a part of the real hardware and software required for running program code are presented as their virtual analogs. From the point of view of the user, the code in Virtual Execution Environment runs as if it were running on the real computing system.

Virtual Machine (VM), a type of an isolated Virtual Execution Environments running on the same physical machine simultaneously. Each Virtual Machine instance executes its own OS kernel (a guest OS kernel). Support of Virtual Machines is implemented using a Virtual Machine Monitor (VMM) and/or a Hypervisor. A Hypervisor or a VMM is a piece of computer software, firmware or hardware that creates and runs Virtual Machines (VMs), and usually has direct access privileges for the hardware resources of the system. A computer on which the Hypervisor runs one or more VMs is called a host machine, and each virtual machine is called a Guest machine.

The present invention is directed to a method, system and computer product for VM virtualization and for a method for informing a host about actual VM needs for individual memory pages. According to an exemplary embodiment, in order to make host not to reclaim "wrong" pages, but reclaim the "right" ones, several techniques can be used. In one embodiment, a hard protection (i.e., a hard memory lock) can be implemented. In another embodiment, direct access to a virtual disk page cache is used. In yet another embodiment, a method of access/dirty (A/D) bits is used depending on a page type. The hard lock can be used for VM kernel pages, and the DAX (direct access) LRU (least recently used) order of pages method can be used for VM DAX pages. The (A/D) bits can be used with other VM pages.

Figure 1:
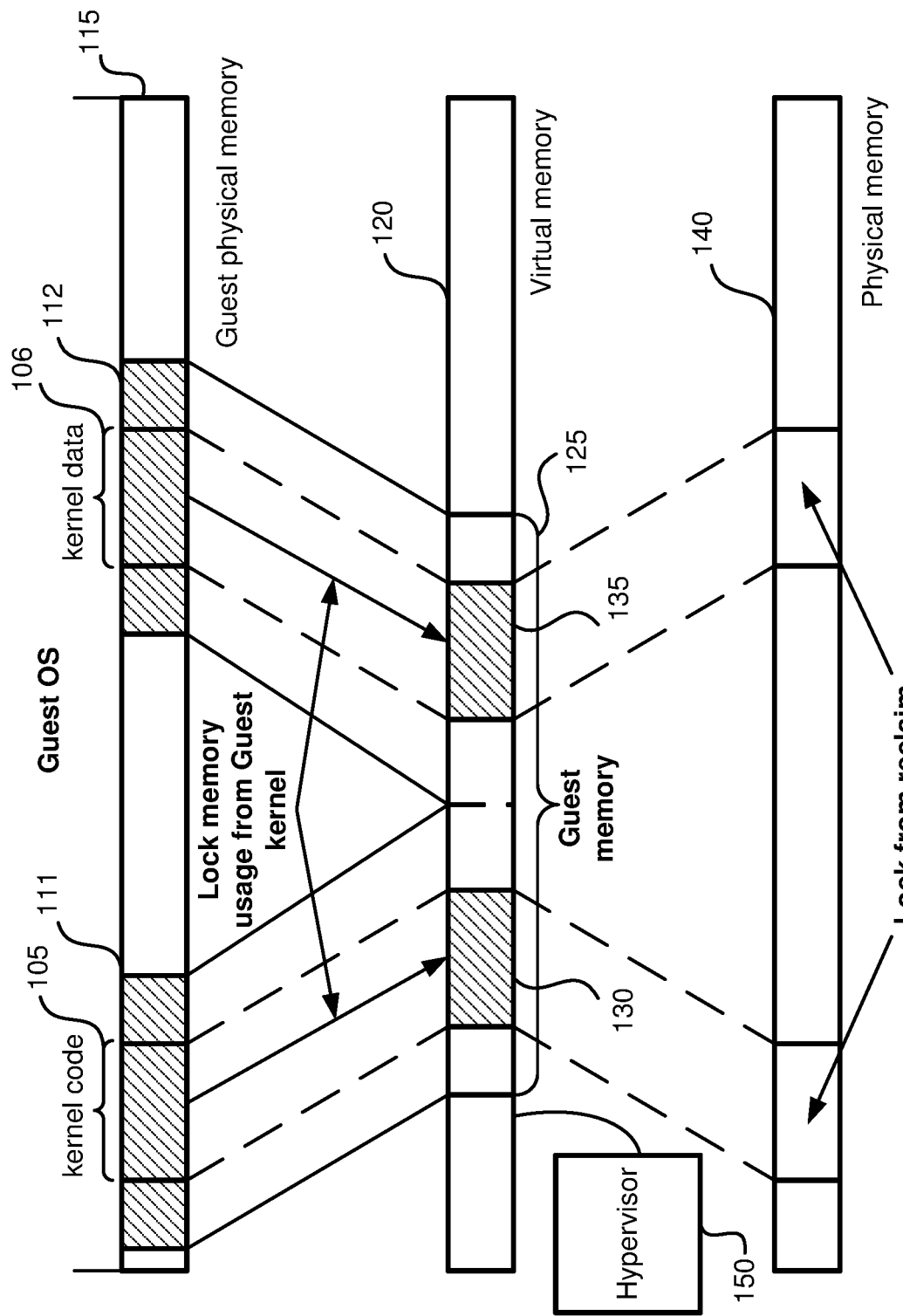
FIG. 1 illustrates memory management using a hard protection, in accordance with the exemplary embodiment.

In one embodiment, a hard protection can be implemented. FIG. 1 illustrates memory management using a hard protection, in accordance with the exemplary embodiment. Guest physical memory 115 is used by Guest OS, which uses the Guest physical memory 115 for storing kernel data 105/106 and other Guest OS data 111/112. All Guest OS data is translated into host virtual memory 120, where the Guest memory data occupies the area 125. A hypervisor 150 has access to the host virtual memory 120. However, the Guest OS kernel code 130 and kernel data 135 translated to Guest virtual memory 125 should not be changed by the hypervisor 150. Thus, the system kernel hard locks the corresponding kernel data areas for reclaim on the physical memory 140.

The VM configuration utility can call Hypervisor APIs for implementing a hardlock protection. The VM configuration utility (i.e., Guest tools) determines where the kernel pages are located on the Guest (i.e., VM) so they can be locked by the Hypervisor API (i.e., a hypercall, which uses the Guest physical addresses of the area to be locked as the parameters of the hypercall). The kernel pages that need to be locked can be determined based on a Linux™ memory map by the Guest tools. In case of other OSs, the principle is the same, but a special utility allowing the Guest tools to inquire about the kernel pages (i.e., memory map) needs to be implemented.

Therefore, in exemplary some embodiments, some pages used by the VMs are not reclaimed at all. When running on a host, the kernel never reclaims some pages that are used by the kernel code and the kernel data. Respectively, when supervising or running a VM, the host kernel can "hard lock" pages with the Guest kernel code and the Guest kernel data. Hard locking means respective pages must not be reclaimed by the host.

According to another embodiment, direct access to virtual disk page cache is implemented. When using a typical VM virtual disk driver, a memory cache of the disk is allocated inside the Guest kernel and is managed by the Guest LRU (and is, thus, ignored by a host LRU and by memory reclaim as described above). There are two technologies called DAX (direct access) and XIP (execution in place)—a virtual disk that is represented in the Guest as a sequence of RAM pages (DAX) and file system mode that runs directly in memory without allocating additional pages for the cache (XIP). By using these two technologies on the VM disk, a root disk page cache management can be moved from a Guest LRU list to a host LRU list, thus making memory reclaim of VM disk caches more efficient.

Figure 2:
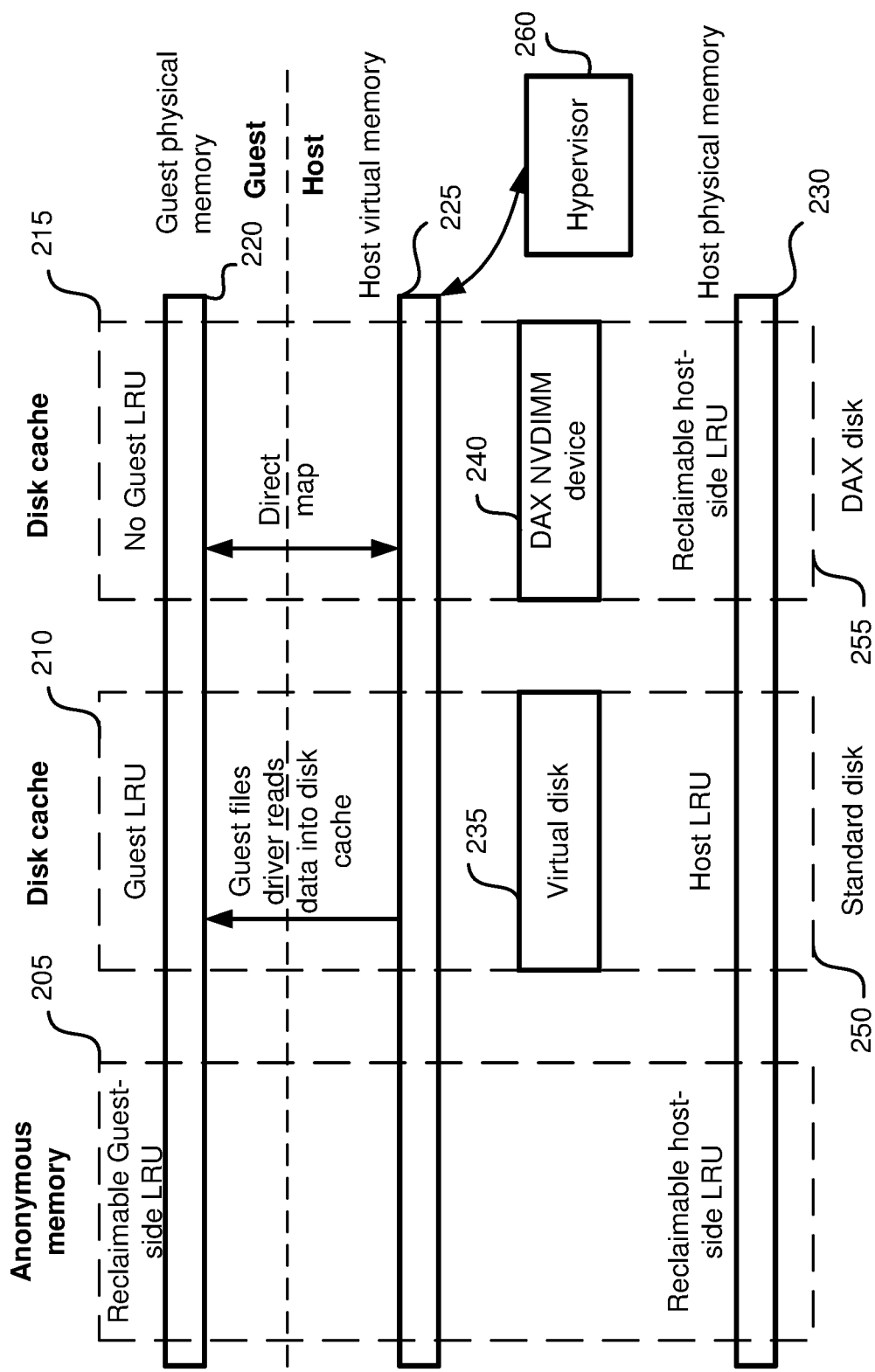
FIG. 2 illustrates memory management using direct access to a virtual disk page cache, in accordance with the exemplary embodiment.

FIG. 2 illustrates memory management using direct access to a virtual disk page cache, in accordance with the exemplary embodiment. In Guest memory 220 an anonymous memory area 205 has reclaimable Guest side LRU, disk cache 210 has Guest LRU and disk cache 215 does not have Guest LRU. Disk cache 210 is populated when the Guest files driver reads data into the disk cache from a host virtual memory 225. The disk cache 215 uses direct mapping from the host virtual memory 225.

A hypervisor 260 accesses the host virtual memory 225. Then, the host physical memory can be accessed by the hypervisor 260 as follows. The reclaimable host-side LRU on the host physical memory 230 is used via DAX NVDIMM device 240 using a DAX disk 255. In case of the disk cache 210, a virtual disk 235 is used for accessing data via a host LRU using a standard disk 250. In case of anonymous memory 205, the reclaimable host-side LRU can be used less efficiently than in case of the DAX disk 255. The kernel recognizes the DAX pages based on their source. According to the exemplary embodiment, the DAX pages are moved from the LRU management of the Guest by the Guest kernel, while these pages remain in the LRU management of the host.

In another embodiment, re-using of hardware access and dirty (A/D) bits can be implemented. Modern CPUs provide for so-called "nested" paging for hypervisors to configure how the VMs access the physical memory. When the VM accesses particular physical pages, the CPU can mark this access in nested page mappings with A/D bits. These bits are already present in regular page tables and can be used as well by the hypervisors.

Figure 3:
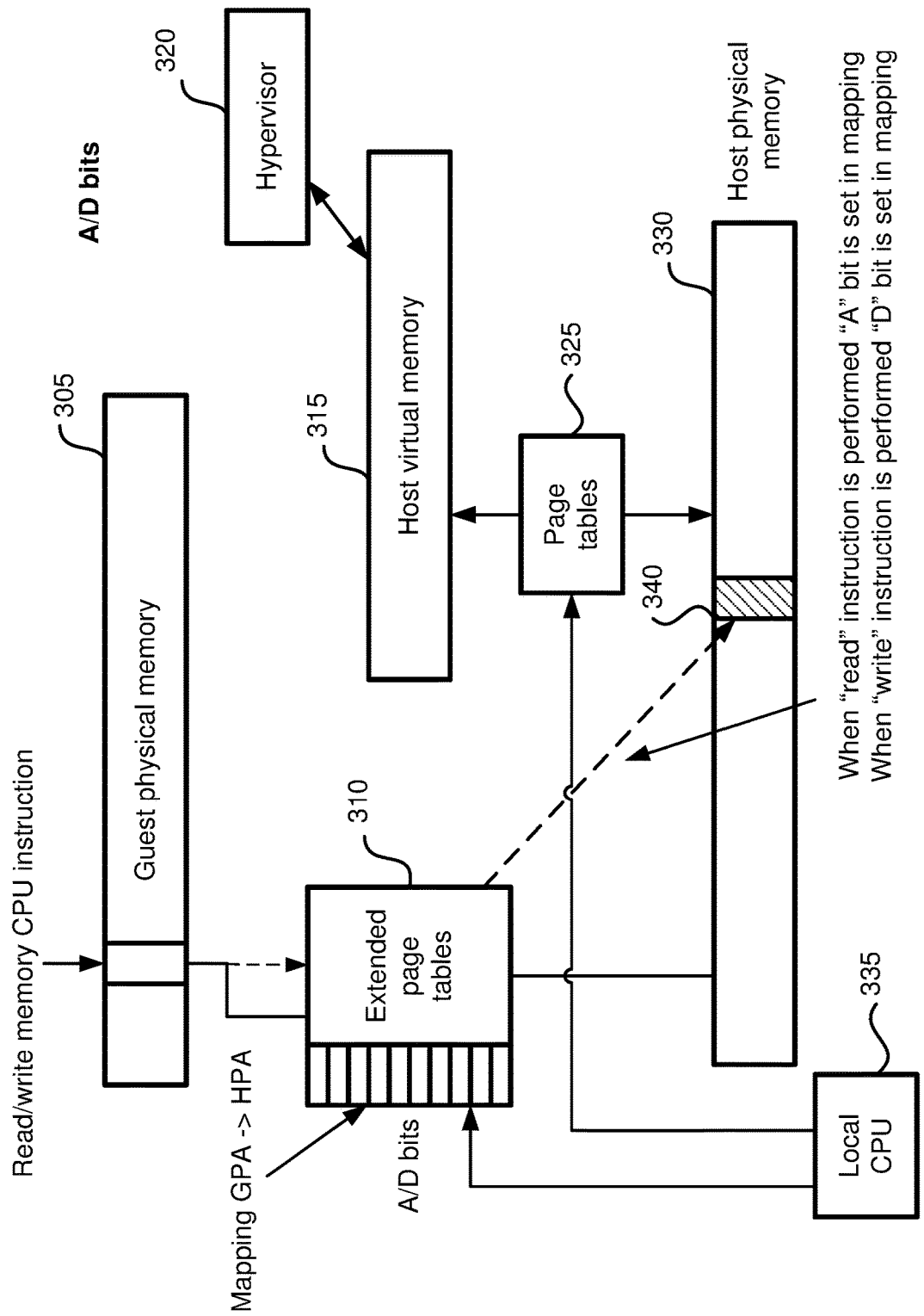
FIG. 3 illustrates memory management using access/dirty (A/D) bits, in accordance with the exemplary embodiment.

FIG. 3 illustrates memory management using access/dirty (A/D) bits, in accordance with the exemplary embodiment. A Guest physical memory 305 receives a memory read/write CPU instruction. The request goes to extended page tables 310 having A/D bits. A local CPU 335 performs mapping (translation) of guest page addresses (GPA) into host page addresses (HPA). The local CPU 335 has access to page tables 325 describing pages in host physical memory 330. In order to control host physical memory usage by a VM (via the hypervisor 320) an A/D control bit 340 is set as follows. When a "read" instruction is performed, the control bit 340 is set as A, and when a "write" instruction is performed the control bit 340 is set as D in the page table mapping. This way, required physical pages are write-protected from the VM write operations.

Note that the A/D bits from the nested page tables are used for reclaiming VM memory. The Hypervisor reads A/D bits and performs the VM memory reclaim based on the A/D bit values. The A/D bits values are set as follows: "0s" are set by hypervisor and "1s" are set by the host CPU as it processes memory access requests. The hypervisor periodically scans through memory in order to see which pages are used and which are not. If the hypervisor sees a page with A/D bit set at "1" (the page is used), the hypervisor changes this bit to "0". If on a subsequent pass, the hypervisor sees that this bit is reset back to "1" in the page table, the hypervisor then knows that this page is being currently used and cannot be reclaimed.

Figure 4:
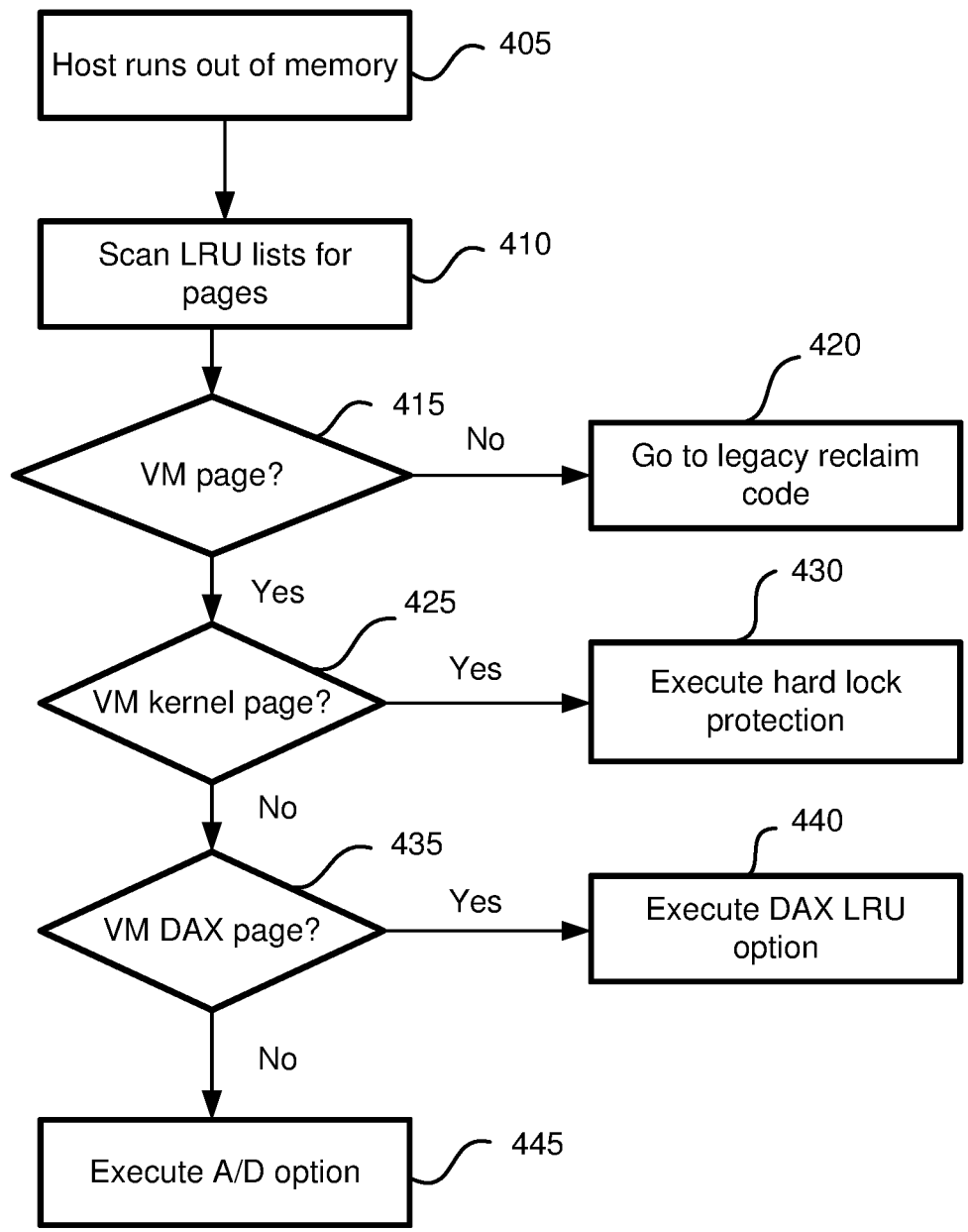
FIG. 4 illustrates a flowchart of a memory reclaim method, in accordance with the exemplary embodiment.

FIG. 4 illustrates a flowchart of a memory reclaim method, in accordance with the exemplary embodiment. In this example, in step 405, the host runs out of memory. The process scans pages in LRU (least resent used) order in step 410. In step 415, the process checks if a page is a VM page. If the page belongs to the VM, the process checks if the page is a kernel page in step 425. If the page is a kernel page, the process executes a hard lock protection mechanism (see FIG. 1). Otherwise, the process checks if the page is a VM DAX page in step 435. If the page is a VM DAX page, the process executes DAX LRU method depicted in FIG. 2. Otherwise, the process executes A/D bit method (see FIG. 3). If, in step 415, the page is deemed to be not a VM page, the process goes to a legacy reclaim code in step 420. (Here, legacy reclaim, or host-based reclaim, refers to the host reclaiming memory without regard to whether the memory page has been allocated to applications running under the host or to the VM—from the perspective of the host, all memory pages are the same, including those that might contain VM guest kernel code or VM guest application code. The VM guest kernel itself can also perform the legacy reclaim process, but, obviously, only on the memory that has been allocated to the VM.)

Figure 5:
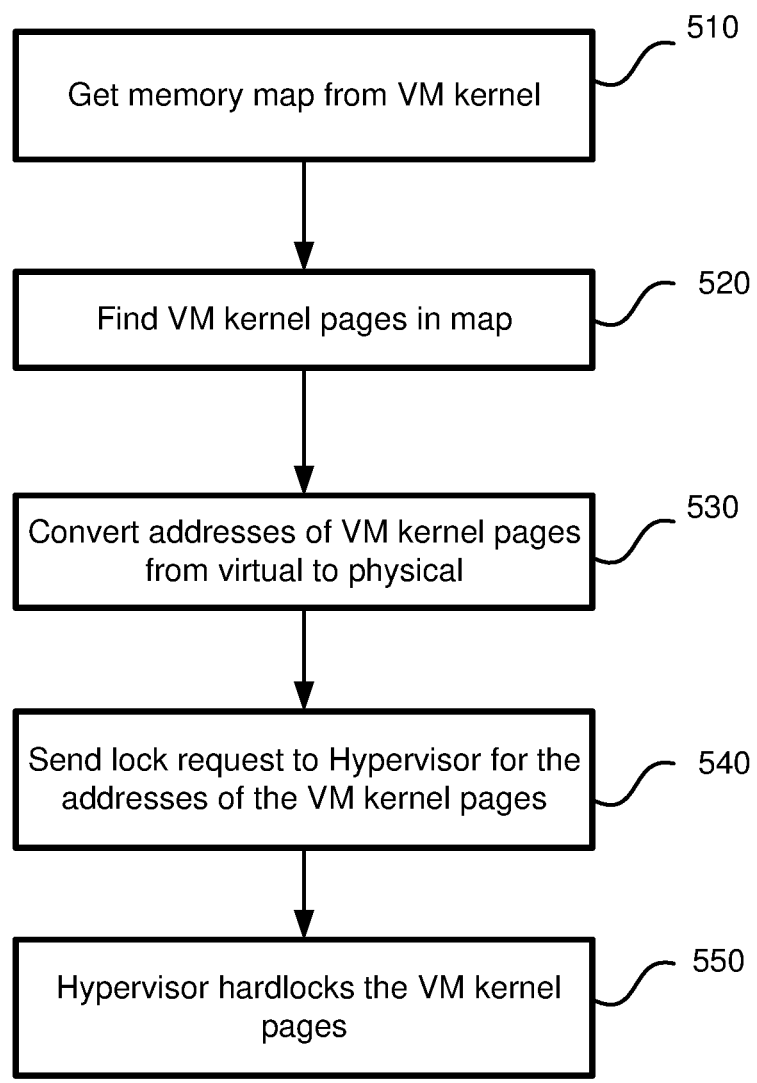
FIG. 5 illustrates a flowchart of a hardlock protection method, in accordance with the exemplary embodiment.

FIG. 5 illustrates a flowchart of a hardlock protection method, in accordance with the exemplary embodiment. In step 510, the process acquires a memory map from VM kernel. The VM kernel pages are detected in the map in step 520. The addresses of the VM kernel pages are converted from guest virtual to host physical (from guest to host) in step 530. The process sends the lock request to the Hypervisor for the addresses of the VM kernel pages in step 540. In step 550, the Hypervisor hardlocks the VM kernel pages.

Figure 6:
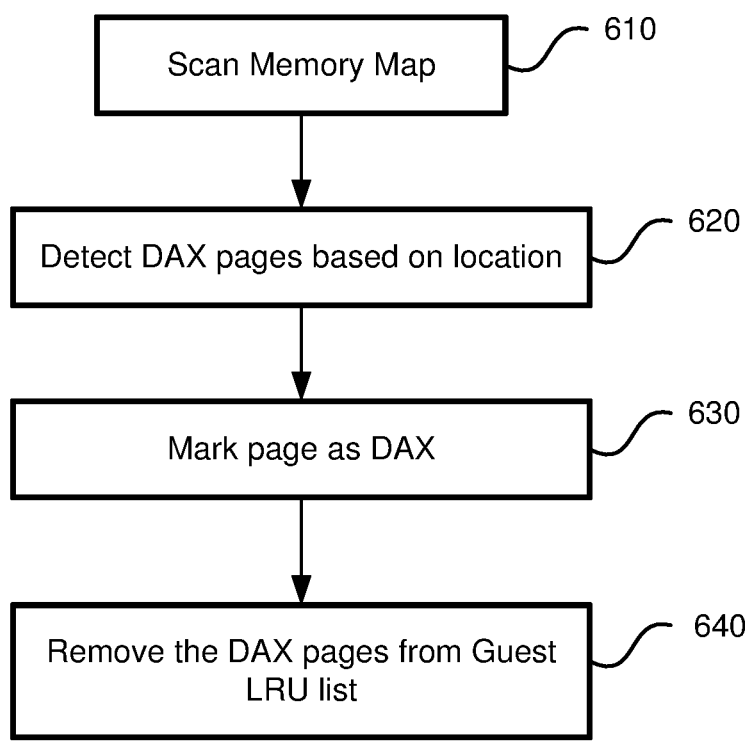
FIG. 6 illustrates a flowchart of a DAX LRU method, in accordance with the exemplary embodiment.

FIG. 6 illustrates a flowchart of DAX LRU method, in accordance with the exemplary embodiment. In step 610, the process scans memory pages and detects DAX pages based on their source location in step 620. The process marks pages as DAX pages in step 630 and removes the DAX pages from a Guest LRU list in step 640.

Figure 7:
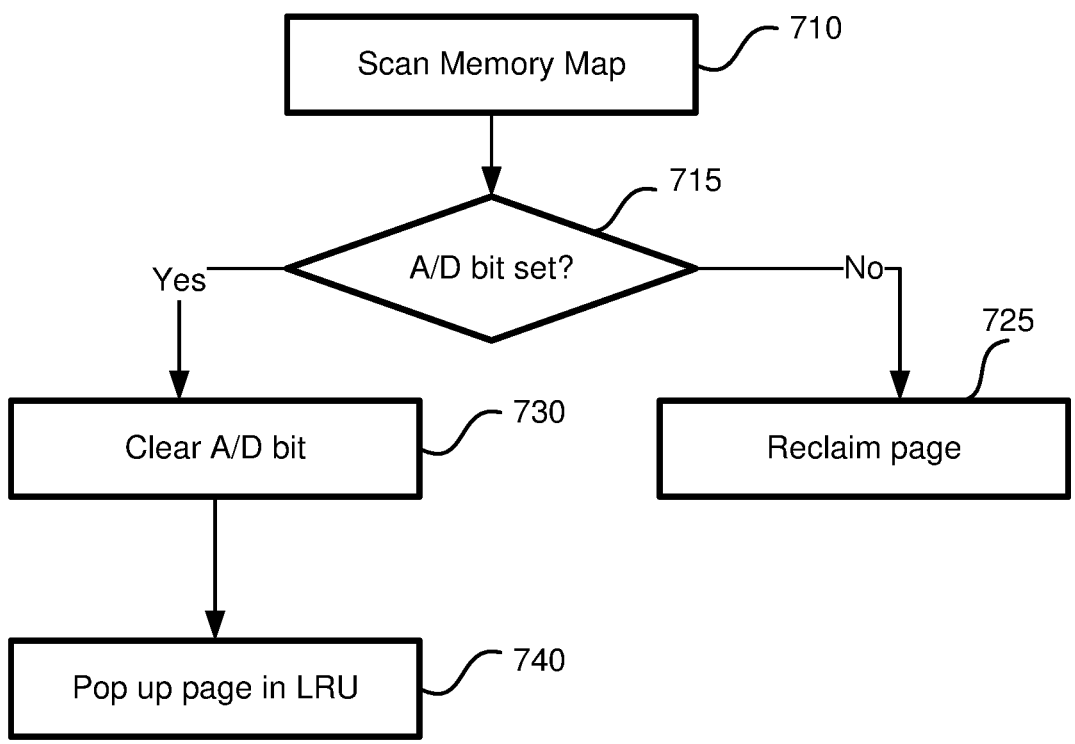
FIG. 7 illustrates a flowchart of an A/D bit method, in accordance with the exemplary embodiment.

FIG. 7 illustrates a flowchart of A/D bit method, in accordance with the exemplary embodiment. The process scans a memory map in step 710. If the A/D bit is set in step 715, the Hypervisor clears the A/D bit in step 730 and pops up page in the Guest LRU list in step 740. Otherwise, the page is reclaimed in step 725.

As a further option, the hypervisor can force a slowdown in VM operations before beginning the reclaim (for example, if the share of CPU time spent on the reclaim is over some threshold, e.g., 10%, or 20-30%), to avoid interfering with VM operations too much. The slowdown can be implemented by the hypervisor forcing the scheduler to treat that particular VM as low priority, or by inserting a delay into interrupt handling of interrupts that originate in that particular VM (on the assumption that most VMs will wait until they receive notice that the interrupt has been handled).

As a further option, the host CPU can do a synchronous deduplication of a memory page when the page is regular VM page, to avoid performing the reclaim separately for the duplicate pages—assuming such duplicate pages exist.

As a further option, the host CPU can compress data in the memory pages if possible, and if not possible, will perform the access/dirty (A/D) bit marking, when the pages are regular VM pages.

Figure 8:
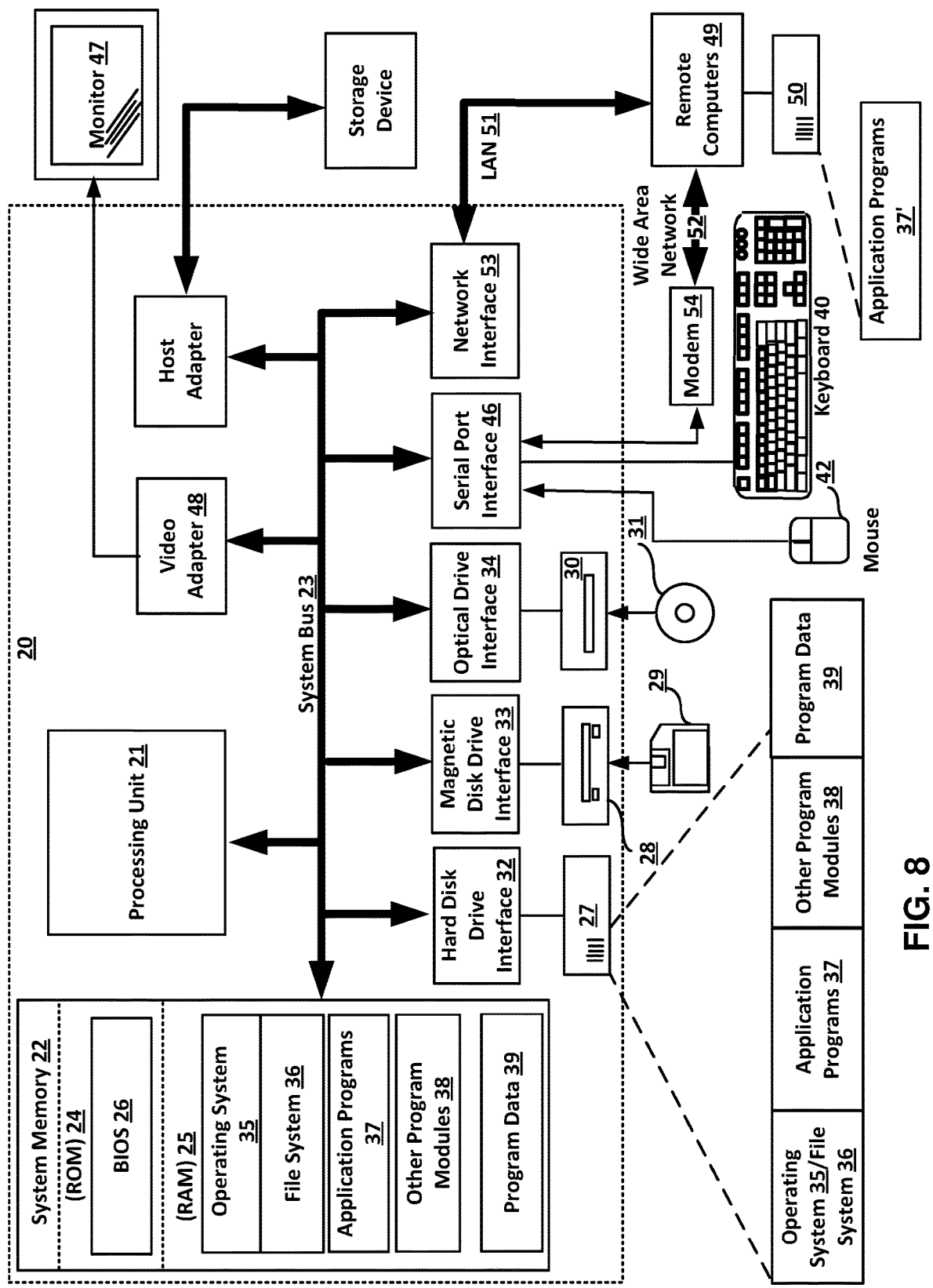
FIG. 8 illustrates a computer system or a host server, which can be used in the exemplary embodiment.

With reference to FIG. 8, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 20 includes a file system 36 associated with or included within the operating system 35, such as the Windows NT™ File System (NTFS), one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A system for managing host reclaimable memory based on Virtual Machine (VM) needs, the system comprising:
   a plurality of VMs running on the host;
   a hypervisor configured to process VM memory requests;
   a host CPU configured to control host physical memory reclaim process;
   at least one VM being allocated physical memory by the host;
   a Guest tool configured to determine page types based on a memory map; and
   a host module configured to scan a Least Recently Used (LRU) list for pages that it can reacquire, and to force a slowdown in VM operations when reclaim operations use up more than a predefined share of CPU time,
   wherein the host CPU performs one of the following based on the page type:
   (i) executes a hard lock protection, when the page is a VM kernel page, to perform a host-based reclaim of the page for the host when no other VM pages are left to reacquire; and
   (ii) executes access/dirty (A/D) bit marking, when the page is a regular VM page, to perform the host-based reclaim of the page for the host from the at least one VM.

2. The system of claim 1, wherein the Guest tools move the VM DAX pages from a Guest LRU management and keep the VM DAX pages in a host LRU management.

3. The system of claim 1, wherein the Guest tool determines VM kernel pages by accessing a memory map based on their addresses in a Guest memory.

4. The system of claim 1, wherein the hypervisor periodically scans page tables and sets the A/D bits to "0" on a first pass.

5. The system of claim 1, wherein the Guest tool informs the host kernel about which pages are needed by the VM.

6. The system of claim 1, wherein, during the DAX LRU operation, the system scans guest memory pages to detect DAX pages based on their source location, marks the guest memory pages as DAX pages and removes the DAX pages from the LRU list.

7. The system of claim 1, wherein, during the A/D bit marking, the system translates guest page addresses into host page addresses.

8. The system of claim 7, wherein the system sets an A/D control bit as A when a "read" instruction is performed, and sets the A/D control bit as D when a "write" instruction is performed, so as to write-protect the physical pages from the VM write operations.

9. The system of claim 8, wherein the hypervisor periodically scans through memory in order to identify pages are used by the VM.

10. The system of claim 1, wherein the host CPU also (iii) executes a direct access (DAX) LRU operation, when the page is a VM DAX page, to perform a host-based reclaim of the page for the host from the at least one VM as if the page is a file cache page.

11. The system of claim 1, wherein the host CPU also (iii) performs a synchronous deduplication of a memory page when the page is regular VM page, to perform a host-based reclaim of the page for the host from the at least one VM.

12. The system of claim 1, wherein the host CPU also (iii) performs a compression of memory pages when the pages are regular VM pages, to perform a host-based reclaim of the pages for the host from the at least one VM.

13. The system of claim 1, wherein the host CPU also (iii) performs a host-based reclaim operation, when the page is not a VM page.

14. The system of claim 1, wherein the predefined share is at least 10%.

15. The system of claim 1, wherein the slowdown is forced by the hypervisor identifying the VM as having a lower priority.

16. The system of claim 1, wherein the slowdown is forced by the hypervisor forcing delays in handling VM-generated interrupts.

17. The system of claim 1, wherein the wherein the host CPU also (i)(a) performs a synchronous deduplication of memory pages when the pages are regular VM page, if possible, otherwise, performs a compression of memory pages when the pages are regular VM pages, and then performs the access/dirty (A/D) bit marking in (ii).

18. A method for managing host reclaimable memory based on Virtual Machine (VM) needs, the method comprising:
   starting a hypervisor for processing VM memory requests;
   launching at least one VM on a host;
   scanning a least recently used (LRU) list for memory pages;
   determining VM kernel pages, DAX pages and regular VM pages;
   forcing a slowdown in VM operations;
   executing a host-based reclaim code, when the page is not a VM page;

executing a hard lock protection, when the page is a VM kernel page, to perform a host-based reclaim of the page for the host when no other VM pages are left to reacquire; and executing access/dirty (A/D) bit marking, when the page is a regular VM page, to perform a host-based reclaim of the page for the host from the at least one VM.

19. The method of claim 18, further comprising determining VM kernel pages by accessing a memory map based on their addresses in a Guest memory.

20. The method of claim 19, further comprising executing a hypercall using Guest addresses of a VM kernel area to be locked as parameters.

* * * * *